H. R. WALLACE.
DEVICE FOR DRAINING RECEPTACLES.
APPLICATION FILED MAR. 18, 1921.

1,398,211.

Patented Nov. 22, 1921.
2 SHEETS—SHEET 1.

Inventor
Harvey R. Wallace

By Mason Fenwick & Lawrence,
Attorneys

H. R. WALLACE.
DEVICE FOR DRAINING RECEPTACLES.
APPLICATION FILED MAR. 18, 1921.
1,398,211. Patented Nov. 22, 1921.
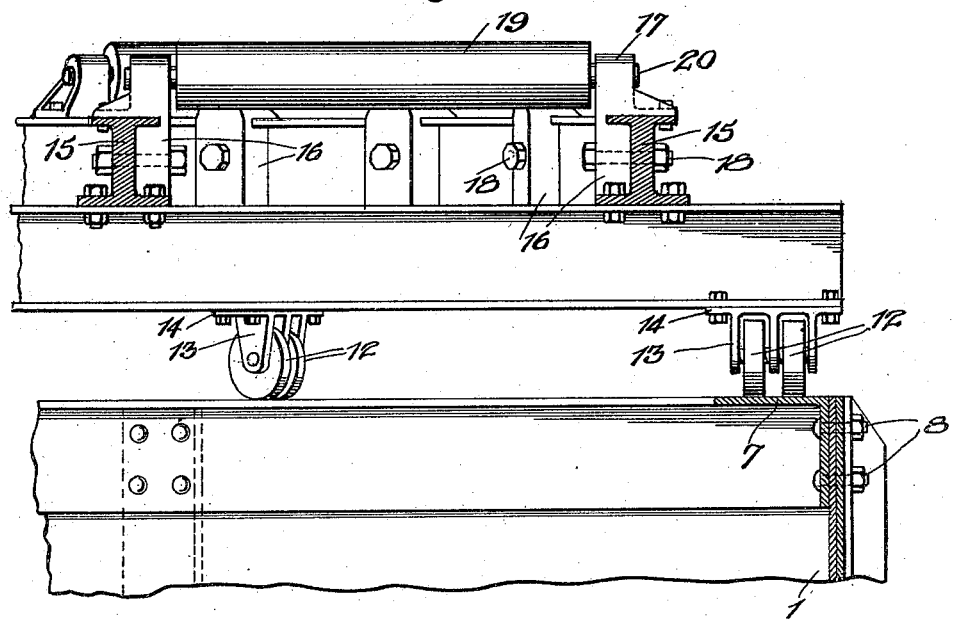
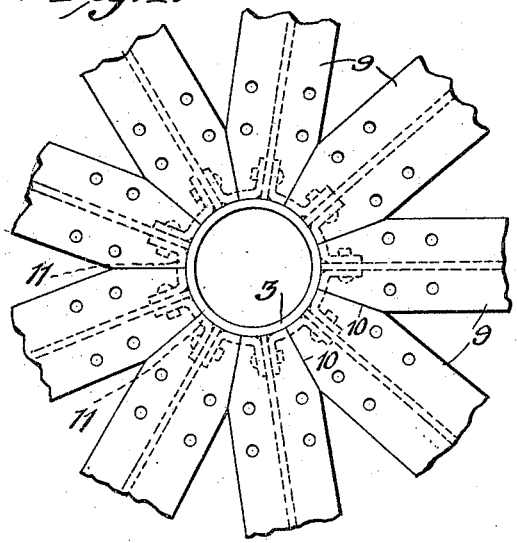
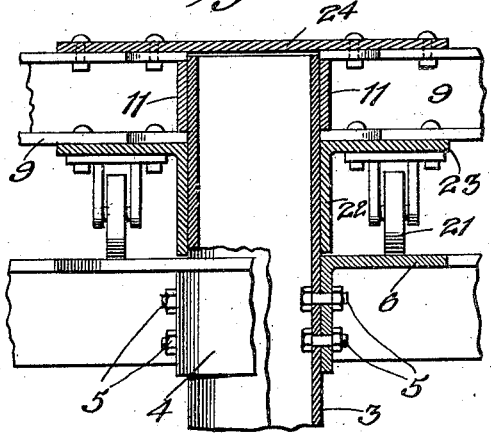
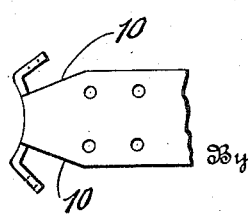
Inventor
Harvey R. Wallace

UNITED STATES PATENT OFFICE.

HARVEY RAY WALLACE, OF BROOKLYN, NEW YORK, ASSIGNOR TO LOFT INCORPORATED, OF NEW YORK, N. Y.

DEVICE FOR DRAINING-RECEPTACLES.

1,398,211. Specification of Letters Patent. Patented Nov. 22, 1921.

Application filed March 18, 1921. Serial No. 453,525.

*To all whom it may concern:*

Be it known that I, HARVEY R. WALLACE, citizen of the United States, residing at Brooklyn, in the county of Kings and State of New York, have invented certain new and useful Improvements in Devices for Draining-Receptacles; and I do hereby declare the following to be a full, clear, and exact description of the invention, such as will enable others skilled in the art to which it appertains to make and use the same.

This invention relates to a new and useful device for draining receptacles, such as sirup barrels and similar receptacles which are particularly adapted for containing liquid material of this character. The main object of this invention is the provision of a device for draining receptacles, which includes a rotatable member upon which the receptacles are placed and slowly rotated until the contents of the receptacles have been entirely drawn therefrom.

Another object of the present invention is the provision of a device for draining receptacles which includes in its construction a vat or other receptacle having arranged above the same a turn table upon which the receptacles are mounted and slowly rotated to drain the contents thereof, the temperature surrounding the vat and turn table being sufficient to maintain the contents of the receptacle in a flowing condition.

Another object of this invention is the provision of a receptacle upon which is mounted a turn table, said turn table being provided with a series of parallel arranged rollers, whereby a receptacle can be placed upon these rollers and slowly rotated by means of the turn table, whereby the contents of the receptacle can be thoroughly drained therefrom through the rotation of the turn table after the receptacle has completed the entire circle described by the turn table.

With the above and other objects in view, the invention consists in the novel features of construction, the combination and arrangement of parts hereinafter more fully set forth, pointed out in the claims and shown in the accompanying drawings, in which—

Figure 1:
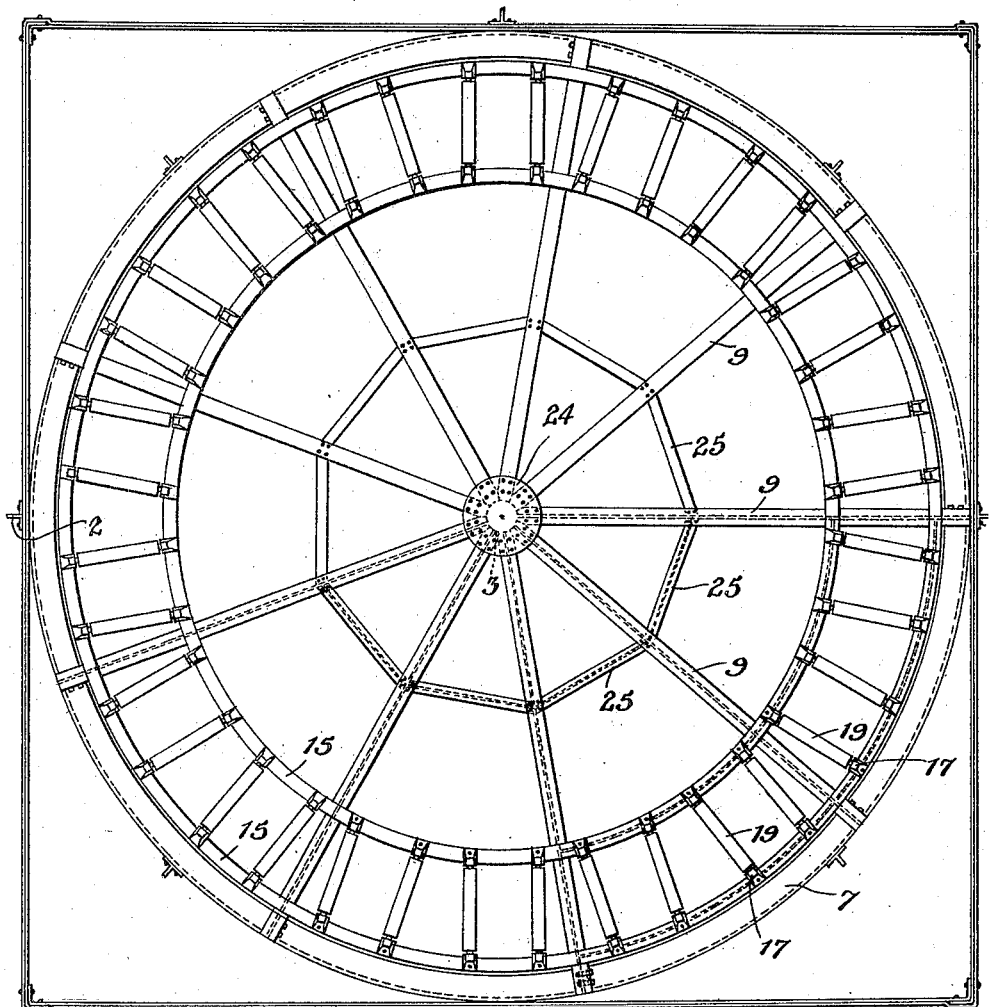
Figure 2:
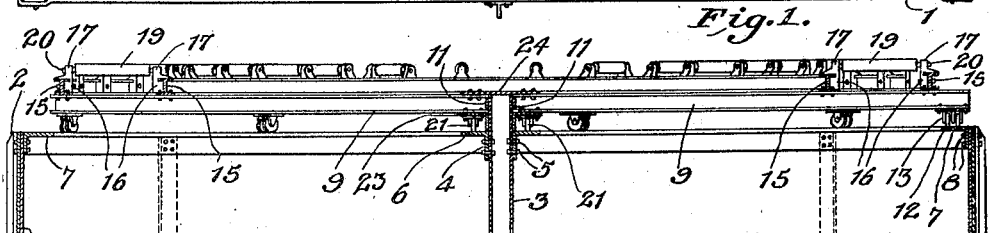

Figure 1 is a top plan view of a device constructed in accordance with my invention, Fig. 2 is a transverse sectional view, Fig. 3 is an enlarged transverse sectional view, taken through the turn table and one side of the receptacle, Fig. 4 is a top plan view of the central portion of the turn table, illustrating the manner of connecting the radial beams together at their meeting points, Fig. 5 is an enlarged sectional view taken through the central portion of the turn table, and Fig. 6 is a top plan view of the inner end of one of the radial supporting bars.

In carrying out my invention, I provide a receptacle, generally indicated by the numeral 1, preferably formed of sheet metal such as galvanized iron or the like, and is provided at intervals upon its exterior with a plurality of upstanding reinforcing members 2, said reinforcing members being preferably disposed between each corner of the receptacle as shown in Fig. 1.

Extending upwardly from the central portion of the receptacle 1 is a central standard 3, upon which is mounted a sleeve 4, said sleeve being bolted or otherwise secured to the standard 3 by means of the bolts 5, which extend through the sleeve 4 and through the standard 3 in order to retain the sleeve in its proper position upon the standard. Extending outwardly at right angles to the sleeve 4 is a horizontal flange 6 formed integral with the sleeve and adapted to be disposed annularly around the standard 3. Secured to the upper edge of the body of the receptacle 1 is a circular angle iron, generally indicated by the numeral 7, which is bolted or otherwise secured to the upper edge of the receptacle 1 to provide an annular track. It will be noted that one side portion of the angle iron 7 is bolted to the body 1, while the other side portion projects inwardly from the upper edge of the body 1 and is horizontally disposed to provide an annular track within the receptacle.

My improved turn table which is mounted for rotation above the receptacle 1 includes in its construction a plurality of I beams, generally indicated by the numeral 9, the inner ends of said beams converging to a point surrounding the standard 3 and their horizontal portions being inclined as shown at 10, whereby the inner ends of all of the I beams 9 may be brought close together around the standard 3. The inner ends of the beams 9 are connected together by means of the U-shaped members 11, the ends of which are bolted or otherwise secured to adjacent ends of each of the beams, whereby to provide a substantially annular sleeve movable around the standard 3, to thus retain the inner ends of the beams 9 in their respective positions to each other. The beams 9 extend radially from the central standard 3 and have arranged beneath their outer ends a pair of rollers 12. These rollers 12 are mounted within the downwardly projecting ears 13 of the plates 14 which are secured beneath the I beams 9 at their outer ends. These rollers 12 are also adapted to ride upon the horizontal portion of the members 7, whereby these beams 9 can readily rotate above the central standard 3. Mounted upon the beams 9 adjacent the outer ends are the annular I beams 15, to which are securely bolted the standards 16 of the shaft supports 17, by means of the bolts 18. These I beams 15, being annular, are arranged in spaced relation upon the outer ends of the beams 9 and mounted thereon are the rollers 19 having stub shafts 20 which are mounted for rotation within the shaft bearings 17.

The inner ends of the I beams 9 are supported by means of the rollers 21 which are secured to the lower horizontal portion of the beams by means of the annular members 22, said rollers being adapted to ride over the horizontal portion 6, which is formed on the sleeve 4 to provide for the easy rotation of the turn table when it is desired for use. It will be noted that the means for supporting the rollers 21 include the sleeve 22, having formed integral therewith the horizontally disposed annular flange 23, the sleeve 22 being movable around the standard 3. The inner ends of the beams 9 are further connected by means of a plate 24, which is arranged over the upper end of the standard 3 and having its outer edge bolted or otherwise secured to the upper horizontal portion of the beams 9 at their inner end as clearly illustrated in Fig. 5.

It will be noted that the rollers 19 which are supported within the bearing 17 are arranged in pairs around the entire circle described by the eye beams 15 for the purpose of supporting cylindrical receptacles containing syrups or material of this character, whereby a receptacle can be placed upon one set of rollers, the stopper removed therefrom and the contents of the receptacle permitted to drain into the body of the main receptacle 1. It will be noted that when it is desired to drain the contents of the barrels after they have been placed on the rollers 19, the barrels are rotated so that the stopper is uppermost, so that it can be readily removed. After the stopper has been removed from the barrel, the barrel or other container can be readily turned upon the rollers 19 so that the opening will be at the lowermost point for draining to thus assure the draining of the entire contents of the receptacle or barrel. This is particularly applicable to barrels having stoppers disposed in bung holes arranged in the sides of the body of the barrel or other container. From this, it will be apparent that by beginning at one point on the turn table and placing various receptacles upon the parallel arranged rollers and moving the turn table around as each full receptacle is placed upon the rollers, the receptacle first placed in position will become entirely drained of its contents when it has traveled the entire circumference of the turn table.

It will be understood that this apparatus is preferably disposed within an inclosure having a temperature of about 150°, so that should the contents of the receptacles be congealed or thickened to such an extent that it is beyond the flowing point, the heat within the inclosure will act upon the material and place it in a readily flowing position, so that the contents of the receptacles can be readily emptied by placing upon a turn table and rotating the turn table at intervals as each additional receptacle is placed thereon. It will also be apparent that suitable steam pipes can be installed within the inclosure in which the device is located so as to regulate the temperature within the inclosure to any desired degree and permit the contents of the containers to flow freely. While I have not specified any particular manner for imparting movement to this turn table, it will be understood that any suitable means may be used and I might state that an electrical attachment in the form of a motor provided with an automatic switch so that the operator, by pressing a button can advance the turn table at intervals to a receiving position, whereby the motor will be automatically stopped, might be used. It will be noted in the drawings that I have provided specific means for securing the inner ends of the beams 9 around the standard 3, but it will be understood that any means suitable for the purpose can be employed, if so desired. The beams 9 are also braced and retained in spaced relation by means of the members 25 which are extended between the members and bolted or otherwise secured to the same.

What I claim is:

1. A device of the class described, including a receptacle, a standard arranged centrally within said receptacle, an annular track arranged above the receptacle and concentric with the standard, a turn table mounted for rotation upon said track, rollers supported by said turn table and arranged in spaced parallel pairs for supporting individual receptacles.

2. A device of the class described including a main receptacle, a central standard within the receptacle, an annular track arranged above the receptacle and disposed concentric with the standard, a second annular track surrounding the standard and secured thereto, a turn-table having rollers bearing upon said tracks, spaced rollers arranged in parallel pairs upon the turn-table for supporting individual receptacles.

3. A device of the class described, including a main receptacle, a central standard therein, an annular track disposed above the receptacle, an annular track surrounding the standard and secured thereto, a turn table arranged above the receptacle and including radial members extending outwardly from the standard, means for connecting the inner ends of said radial members to the standard for rotation around the same, annular eye beams mounted upon the outer ends of said radial members and disposed in spaced relation and rollers supported upon said annular eye beams and arranged in spaced parallel pairs.

4. A device of the class described, including a receptacle, a turn table arranged above said receptacle, parallel spaced rollers arranged in pairs upon said turn table for supporting individual receptacles, as and for the purpose set forth.

In testimony whereof I affix my signature.

HARVEY RAY WALLACE.